March 26, 1974  S. E. M. SOLLERUD  3,799,820
PROCESS OF MANUFACTURING OPEN OR CLOSED PACKAGINGS OF FOAM
PLASTICS, PREFERABLY FOAM POLYSTYRENE
Filed Jan. 18, 1972  10 Sheets-Sheet 1

United States Patent Office 3,799,820
Patented Mar. 26, 1974

3,799,820
PROCESS OF MANUFACTURING OPEN OR
CLOSED PACKAGINGS OF FOAM PLAS-
TICS, PREFERABLY FOAM POLYSTYRENE
Soren Elof Mauritz Sollerud, Solviksgatan 26,
603 64 Norrkoping Sweden
Continuation-in-part of abandoned application Ser. No.
114,266, Feb. 10, 1971. This application Jan. 18, 1972,
Ser. No. 218,728
Claims priority, application Sweden, Feb. 11, 1970,
1,754/70
Int. Cl. B65b 7/28; B29c 27/00
U.S. Cl. 156—69
21 Claims

ABSTRACT OF THE DISCLOSURE

A process of manufacturing packages from rigid-type foam plastics, preferably foam polystyrene. Such surfaces as are to be joined are heated by direct contact with movable heating jaws until the desired surface configuration having a layer of molten material thereon has been obtained. The surfaces are then immediately put together and subjected to pressure. After the surfaces have been pressed together a shaping member can be urged against them to shape the joint and wipe any excess molten material therefrom. The heating jaw surfaces are preferably oblique relative to the plane of the surfaces to be joined, whereby the surfaces are bevelled and enlarged to produce a high strength, overlapped weld joint. The surfaces to be joined may also be formed with alternating ridges and valleys to further increase the area of the surfaces joined.

CROSS REFERENCE TO RELATED APPLICATION

This is a continuation-in-part of my copending application Ser. No. 114,266, filed Feb. 10, 1971, entitled "A Process of Manufacturing Open or Closed Packages of Foam Plastics, Preferably Foam Polystyrene," now abandoned.

BACKGROUND OF THE INVENTION

Field of the invention

This invention relates to a process of manufacturing open or closed packages of rigid-type foam plastic materials preferably foam polystyrene.

DESCRIPTION OF THE PRIOR ART

In the packaging industry there has long been a trend to convert from the use of conventional packaging materials, such as cardboard or paper, sheet metal, and glass, to different kinds of plastics. The plastics have established themselves best in ligthweight packages as substitutes for paper since plastics foils can now be manufactured at competitive prices, can be sealed in a simple manner by welding, and possess a superior strength. In semi-rigid packages, such as milk cartons, recourse has been made to a compromise, viz the combination of cardboard or paper and a plastic coating thereon. This solution, though rather expensive, has certain advantages. Rigid plastic packages are mainly used only to package more expensive consumer goods, since the cost of the packages is high; however, a certain reduction of cost can be attained in that packages of this kind, usually of the bottle type, are often made, for instance extruded, at the place of filling. For cheaper consumer goods, and particularly solid and non-flowing materials, packages of the latter kind generally cannot compete with glass, sheet metal and cardboard.

Another evident tendency in the packaging industry is to manufacture the packages at the place of filling, in order to thereby eleminate the considerable costs that are associated with the transportation of the empty packages of the bottle or can type, which have an insignificant weight compared to their volume. While cardboard and paper packages are transported, practically without exception, in a collapsed state and are erected at the place of filling packages of paper and cardboard having a plastics coating are usually manufactured at the place of filling, the starting material used being in the form of a plastic coated paper web. Had this not been the case, packages of this kind would hardly have maintained themselves on the market. Certain types of packages of plastic-coated paper or cardboard are handled like packages of paper or cardboard only, that is they are conveyed in a collapsed state and are erected at the place of use. As already stated, the relatively rigid plastic packages are often manufactured at the place of filling.

It is evident from the foregoing that there is a strong demand for a cheap, relatively rigid lightweight plastic material from which packagings can be manufactured at a price comparable to that of a corresponding paperboard or cardboard carton. However, in order for such a package to be competitive, it should be possible to ship the material in sheets or rolls and the packages of various kinds, including hermetically closed packages, should be easily manufactured at the place where the packages are filled. In that case, such plastic packages could effectively compete with most commerially available packages of different materials.

The desired material already occurs on the market, viz extruded foam polystyrene. The problem, however, is that it has not previously been possible to manufacture satisfactory packages, and particularly sealed, fluid tight packages, of this material at reasonable cost. Many attempts have been made, and considerable sums have been spent on projects for providing a useful package of foam polystyrene after it was established that the material, per se, is not only inexpensive to manufacture but also possesses good tightness and excellent insulating properties, which latter imply great advantages for instance in packaging deep-frozen products which in such packages could be kept at room temperature for a considerably longer time than what is possible with the conventional cardboard packages or cartons. It has also been established that the material can be readily provided with print, also in multi-color technique.

The primary difficulty in manufacturing packages of this excellent material results from the fact that conventional plastic welding methods cannot be used primarily because of the insulating properties of the material. Thus if two pieces of foam polystyrene to be joined are placed in superimposed relation between two heating jaws, these jaws will only melt a groove in the sides of the pieces engaged by the jaws, while the abutting sides of the two pieces will not, or only in an extremely insignificant degree, adhere to one another. Other prior art methods of fastening together plastic surfaces, for instance with the use of ultra-sonics and hot air, have also proved inapplicable for the above reason.

One attempt to manufacture a package from foamed sheet polystyrene is illustrated in U.S. Pat. No. 3,411,969 which is directed to the concept of forming a one-piece tray-type carton from a blank which is die cut from an extruded sheet of foam polystyrene. The side panel portions of the blank are folded upward by forcing the blank through a forming die, and a heated blade member is inserted into and drawn along each of the corner joints from the bottom panel to the open top of the carton to melt a portion of the polystyrene material along the joint as the carton is forced through the folding die. The folding die forces the corners together to form a welded joint as the melted surfaces pass over the heated blade. No provisions are made for sealing the carton flap or cover.

While the technique disclosed in the prior art patent discussed above may be employed to weld the corners of the open-topped tray, it has been found to be a practical impossibility to avoid an opening, or hole, at the bottom of the weld, i.e., at each bottom corner of the carton, in the commercial production of such cartons. This results from the fact that the molten material required to form a good weld must necessarily be produced by melting the adjacent portions of the foam plastic sheet. While an excess of material is provided for this purpose in the side panel of the blank at a distance above the bottom panel, there can be no excess material at the extreme bottom of the weld adjacent the bottom panel, with the result that an opening is produced at the bottom corners of the tray. Further, these welds formed in the corners of the tray, are particularly susceptible to fracture as a result of bending loads produced by internal pressure or loading in the tray.

SUMMARY OF THE INVENTION

The present invention, therefore, has for its object to provide an improved method of manufacturing packages of various kinds from foam polystyrene or expanded plastic materials of similar structure. This object is attained in a package assembled from a plurality of separately formed foam plastic members with the surfaces thereof to be joined simultaneously heated to the melting point of the material over the entire expanse by heating means which are brought in direct contact with said surfaces. The heating is continued until a layer of molten material is obtained which covers the entire surfaces to be joined. The heating means are then removed and the surfaces to be joined are immediately put together and subjected to compression pressure, the rigidity of the plastics being such that it withstands said pressure without deformation at those points where it has not been heated.

BRIEF DESCRIPTION OF THE DRAWINGS

The invention will be described more in detail hereinbelow with reference to the accompanying drawings which show an embodiment of the invention and illustrate a method of manufacturing a substantially parallelepiped container consisting of separate plastic webs constituting the side walls, the bottom and the cover, and which are joined together to form the completed package.

In the drawings.

DESCRIPTION OF THE PREFERRED EMBODIMENTS

The apparatus illustrated in FIGS. 1–14 is part of a large machine for automatically performing the process of manufacturing packages of foam polystyrene in accordance with the invention. Other portions of the machine such as the apparatus for supplying and removing blanks and finished packages, respectively, the control means, etc., are not shown to avoid crowding of the drawings. These devices may be of any conventional construction and, as such, form no part of the instant invention. FIGS. 1–8 of the drawings illustrate the manufacture of a right-angled parallelepiped container having side walls, bottom and cover formed from separate substantially planar blank members, while the carton illustrated in FIGS. 9–14 has generally rounded corners and employs a modified structure for the top and bottom members. It is pointed out, however, that the invention is not limited to any specific configuration, but may be employed to manufacture packages if any desired shape.

Figure 1:
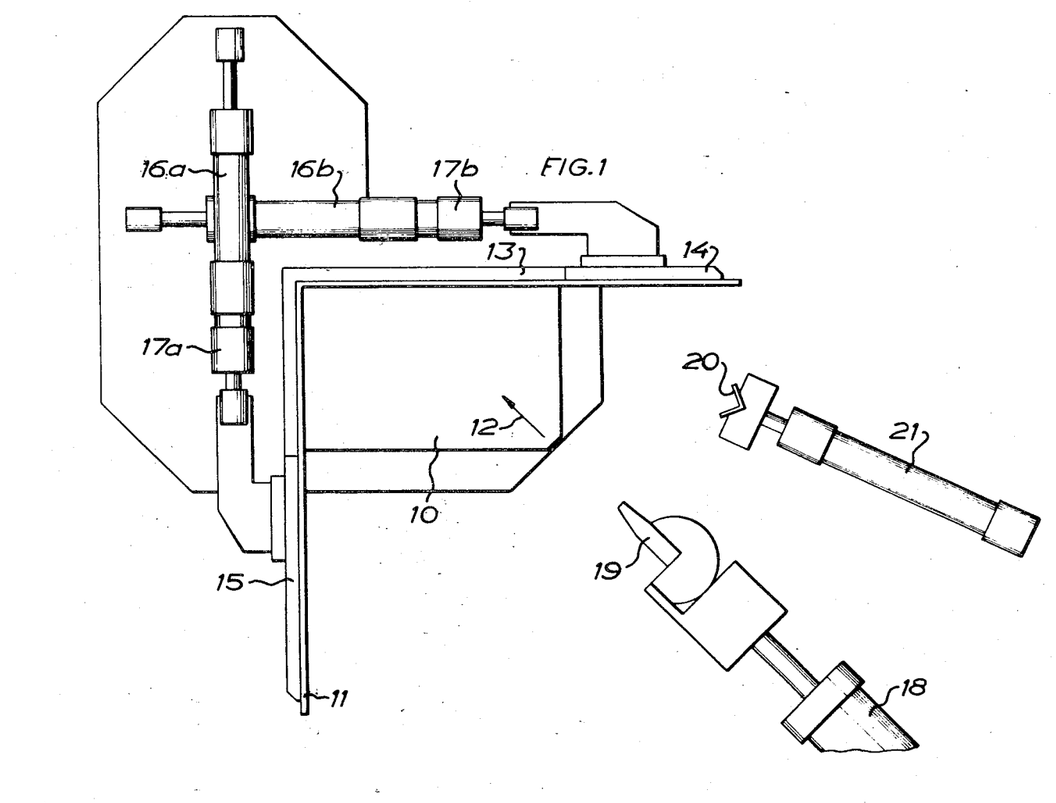
FIGS. 1–3 are schematic plan views showing successive steps in the manufacture of the body portion of a package according to the present invention.
Figure 2:
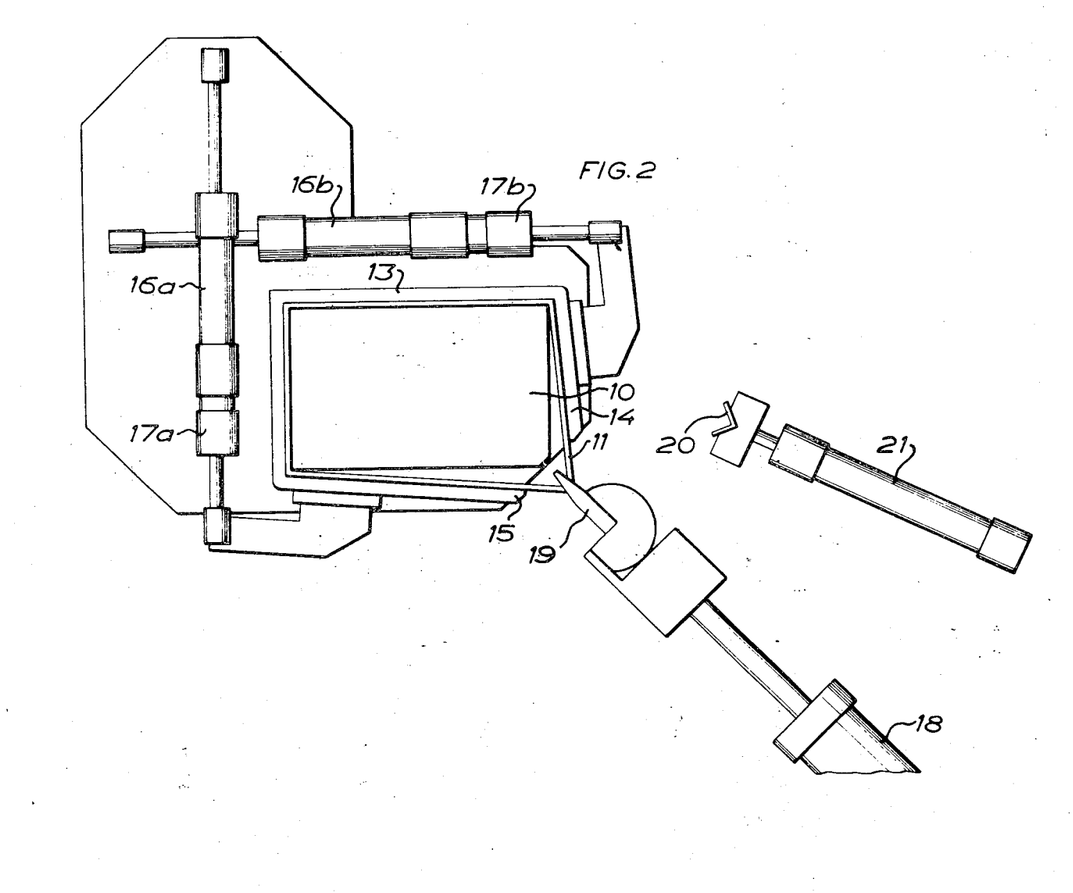
Figure 3:
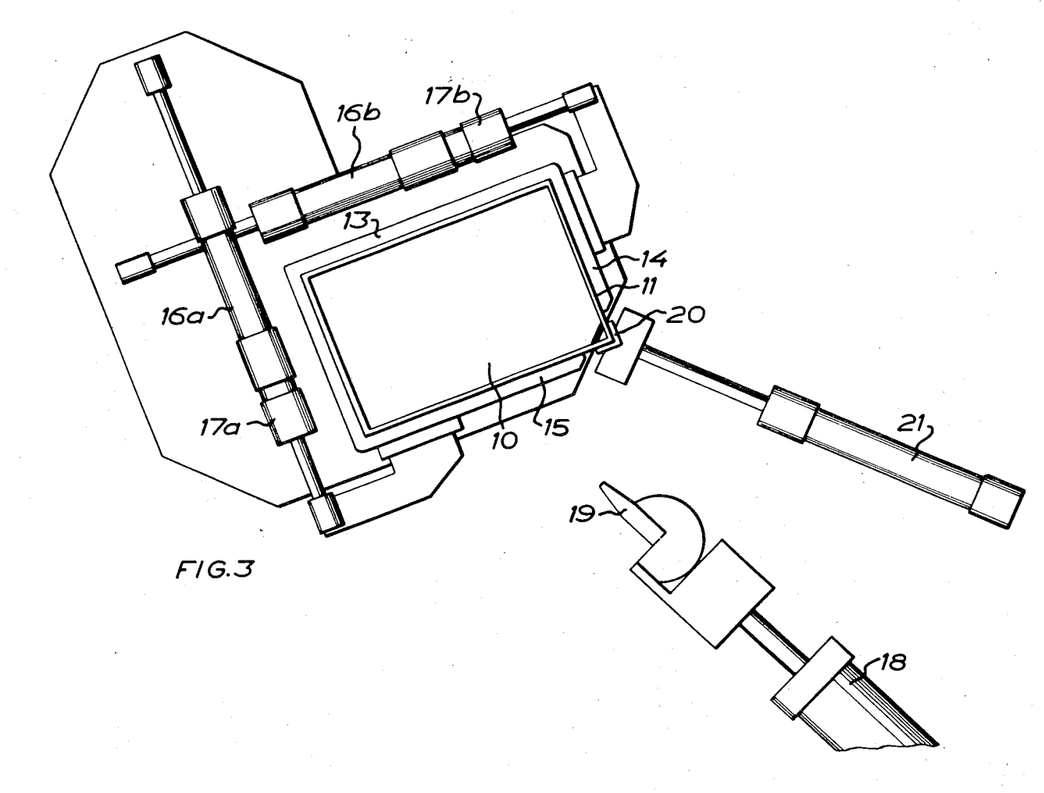

In FIG. 1, 10 designates an inner mold part or mandrel about which a blank 11 of foam polystyrene, which is intended for the manufacture of the side walls of a packaging, are to be shaped and welded together to form an open-ended tubular body member. The mandrel 10 is rectangular in horizontal section except that one corner thereof is cut away for reasons that will be more apparent hereinbelow. The blank 11 of foam polystyrene sheet is wrapped around the mandrel 10 with the flanges resulting from the bending opposite two sides of the mandrel 10, which make a right angle with one another. The mandrel 10 is then moved in the direction indicated by the arrow 12 so that the side of the blank facing away from the mandrel 10 is caused to engage the inner side of an angular member 13. At each of the free ends of the flanges of the angular member 13 there is mounted a folding flap 14 and 15, respectively, which is operable by means of a piston and cylinder unit 16a and 16b, respectively. After the mandrel 10 has been moved towards the angular member 13 a piston and cylinder unit 18 is actuated and a heating means 19 fastened to the piston rod of the unit 18 is moved toward the mandrel 10. Movement of the heating means 19 is continued until the front end thereof is at a small distance from the bevelled corner surface of the mandrel 10 as is shown in FIG. 2. The piston and cylinder units 16a and 16b are then actuated, whereby the folding flaps 14, 15 connected therewith are caused to swing through an angle of approximately 90°, as shown in FIG. 2, the free ends of the blank placed about the mandrel 10 being brought into engagement with the metal heating means 19, as is shown in FIG. 2. The surface of heating means 19 is treated to prevent the molten polystyrene from sticking thereto, as by coating with Teflon, or by plating with silver. The front end of the heating means 19 tapers forwardly in order that the means shall be easily retractable, which takes place after the plastics material has been melted to such an extent that a layer of the molten material covers the surfaces to be joined, at which moment the heating means 19 is retracted to the position shown in FIG. 1 by the action of the piston and cylinder unit 18. At the same time two piston and cylinder units 17a and 17b, respectively, which are connected to the piston and cylinder units 16a and 16b, are caused immediately to move those sides of the blank against the mandrel 10, which did not before engage said mandrel (see FIG. 2). Simultaneously, the entire unit consisting of the mandrel 10, the folding flaps and the piston and cylinder units, is swung counter-clockwise so that an angular pressing means 20, which is reciprocable by means of a piston and cylinder unit 21, will be located precisely opposite the surfaces just put together. The means 20 is pressed into fixed engagement with the corner of the blank facing it, and is maintained in engagement with said corner until the surfaces joined are securely adhered to one another. The mandrel 10 is then moved away from the angular means in the direction opposite to the arrow 12, and the blank 11, now in the form of an open-ended tubular body, is removed from the apparatus after the mandrel 10 has been extracted.

Figure 4:
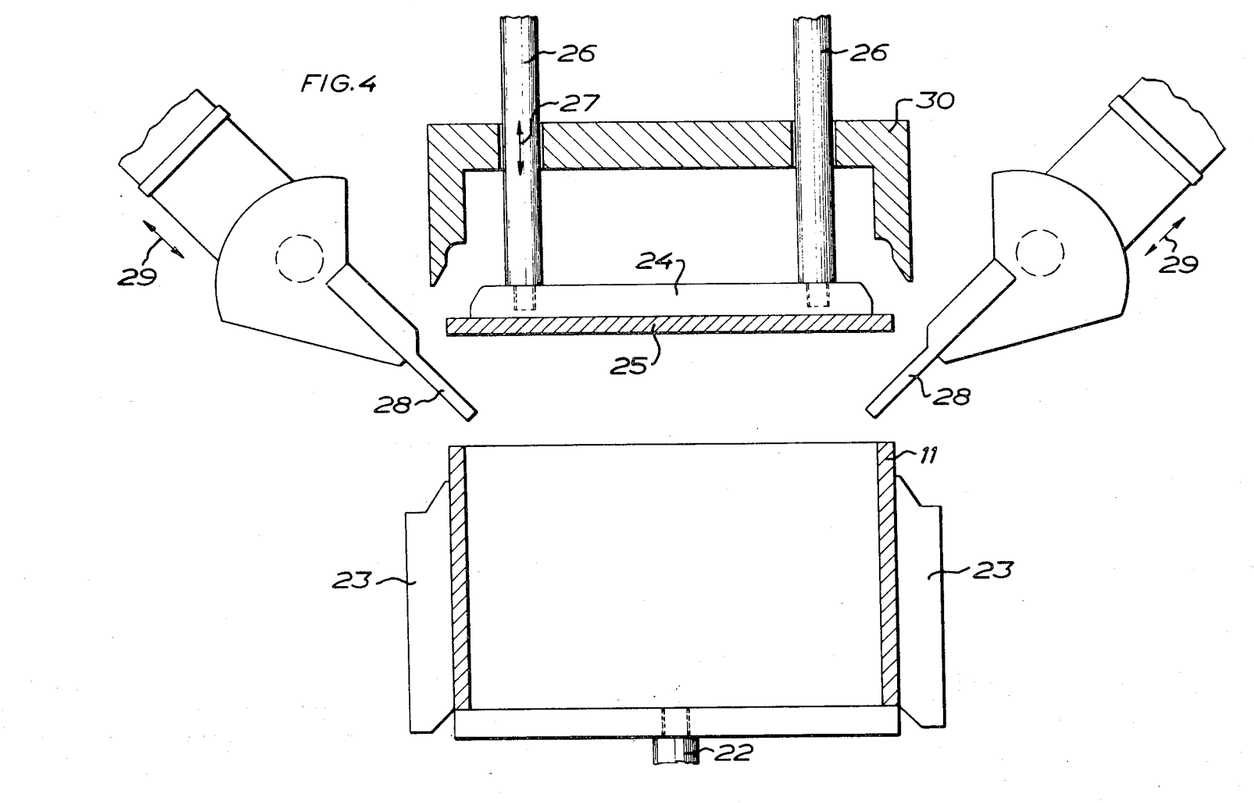
FIGS. 4–6 are vertical sectional views illustrating successive steps in the placement of the bottom and cover on the body portion.

The body blank 11 which has been removed from the mandrel 10 is then brought in position so as to be provided with a bottom in the apparatus shown in FIG. 4 in which the body blank 11 is positioned on a bottom support member 22 which is mounted for vertical movement by piston 22a while the side walls of the blank are supported by mold side pieces 23. Disposed above the blank 11 is a holder plate 24 which, for instance by vacuum action, is able to retain a bottom plate 25 of foam polystyrene above the blank 11. The plate 24 is movable in vertical direction by rods 26, as shown by the double arrow 27. In addition to the mold formed by the parts 22, 23, and 24, there are provided heating means 28 which according to the double arrow 29 are reciprocable by piston and cylinder unts (not shown) in the same way as the heating means 19 in FIGS. 1–3. For greater clarity, only two such heating means 28 are shown, it being understood two similar means (not shown) are arranged to heat the sides extending parallel to the plane of the drawing in FIGS. 4–6.

The heating means 28 are of a width corresponding to the length of the side walls of the blank 11 so that each means heats the entire associated edge surface. From an outer position shown in FIG. 6 the heating means 28 are moved to the position shown in FIG. 4, in which the front ends of the four heating means 28 thus abut each other at the corners, forming a hopper-shaped portion. After the heating means 28 have occupied this position the bottom plate 22 is moved upwardly and at the same time the holder plate 24 downwardly so that the upper edges of the blank 11 are brought into engagement with the underside of the heating means 28 simultaneously as the edge portions of the underside of the bottom plate 25 are brought into engagement with the upper side of said means.

Figure 5:
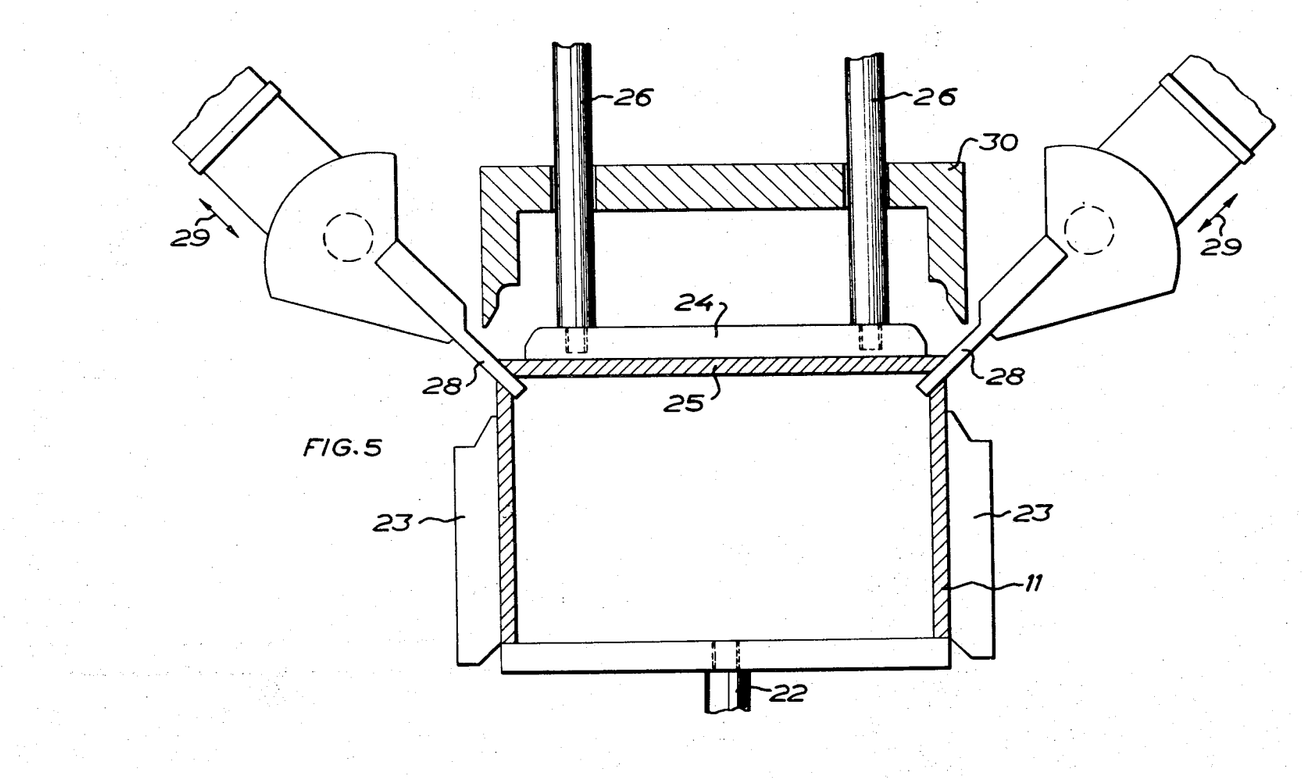
Figure 6:
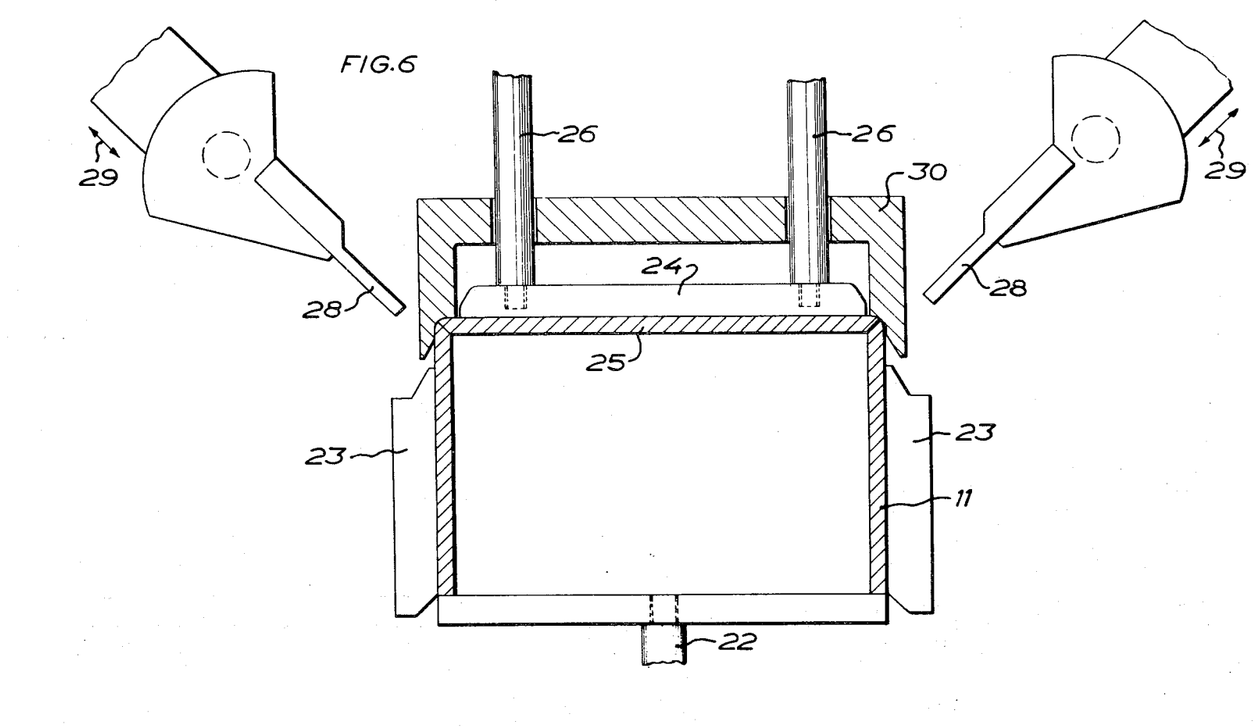

It appears from FIGS. 4–6 that the heating means are oblique to the edge surface and the underside of the bottom plate, and the surfaces engaging the heating means 28 will thus be bevelled at the melting, whereby a larger surface of engagement is formed between the bottom 25 and the blank 11. The blank 11 and the bottom 25 are maintained in engagement with the heating means for a sufficiently long time in order that a layer of molten material of suitable thickness may be formed, and are then removed at the same time, whereupon the bottom 25 and the blank 11 are quickly moved together so that the molten layers will come in contact with one another. Pressure is exerted on the bottom plate 25 by means of the holder plate 24, and the blank 11 is sufficiently rigid to withstand the pressure against the action exerted by the holder plate 24. Disposed above the holder plate 24 is a pressing and shaping device 30 which is then lowered by a suitable piston rod (not shown) over the joint formed, when the blank 11 and the bottom 25 are brought together to round off or shape said joint and to remove any excess of molten material which have escaped from the joint, as is illustrated in FIG. 6.

In the manner described in the foregoing there has been formed an open-ended container which can then either be removed from the apparatus for use as such or be turned in some conventional way and directly filled for instance with a liquid such as milk. A cover may then be placed on the open end in the same way as was described with reference to FIGS. 4–6, and the completed package can be removed from the machine.

Figure 7:
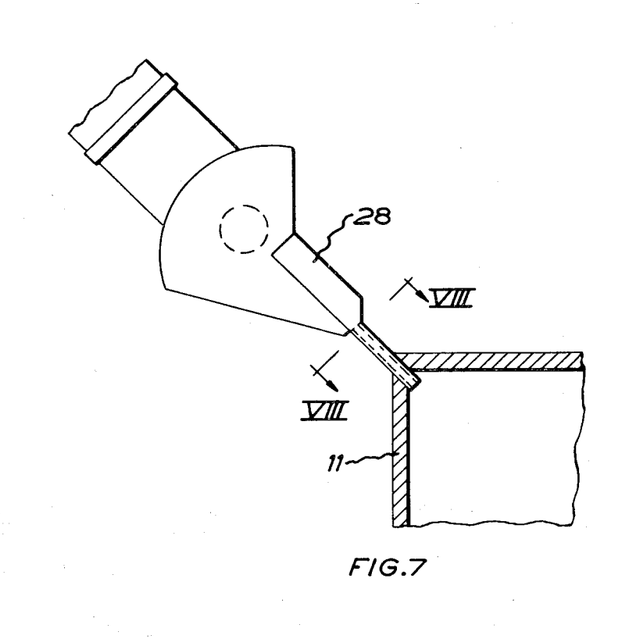
FIG. 7 is a view illustrating a modification of a portion of the structure shown in FIGS. 4–6.
Figure 8:
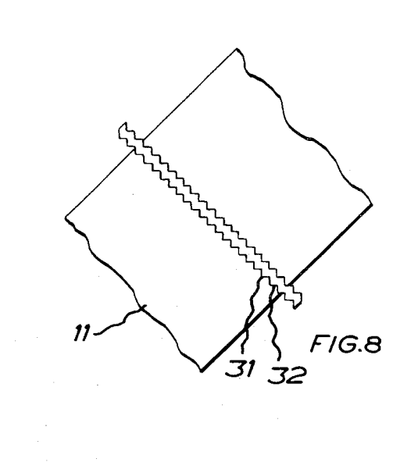
FIG. 8 is a sectional view taken on lines 8—8 of FIG. 7.

FIGS. 7 and 8 show a modification of the heating means 28, which has proved extremely advantageous in practice. Alternating ridges 31 and valleys 32 forming a zig-zag or corrugated pattern are provided on the surfaces of the heating means which are brought into engagement with the surfaces to be joined. As will appear from FIG. 8, the ridges on one surface register with the valleys in the opposite surface. When these surfaces of the heating means are employed to heat surfaces to be joined, conforming ridges and valleys will simultaneously be formed in the surfaces joined so that these surfaces are further enlarged, thereby increasing the strength of the joint.

In the manner described, packagings of foam polystyrene are produced for the first time. The reason for this successful progress is that the property which was earlier considered an insurmountable obstacle to the simple fastening together of two surfaces to be joined, viz the insulating ability of the material, is exploited by the present invention to maintain the thin layer of molten thermoplastic material in a molten state for a time sufficient to permit withdrawing the heating members and putting together the surfaces to be joined and causing them securely to adhere together. It will be realized that the material must have a certain rigidity to permit being treated by the process according to the invention.

Packages manufactured in the manner described above possess many advantages, not the least of which is the relatively low cost of production. However, the butt weld at the corner of the shell which has proved disadvantageous in certain instances in that the packages may rupture along this weld when subjected to internal pressure that may arise, for instance, if the package is subjected to heavy impact loading such as may result from rapid deceleration after a free fall. This is particularly true when the package is filled with a liquid which produces relatively high hydrostatic pressures within the package when the package is subjected to impact loading. On such an occasion, the packages tend to take a spherical shape, resulting in the weld being subjected to rather severe bending stresses combined with increased hoop or tensile stresses which may result in rupture of the welded joint. At the same time, the butt weld in the corners of the package may be advantageous for packaging carton products. For example, frozen foods such as meats and vegetables will retain their shape and, therefore, do not tend to rupture the carton when subjected to heavy impact loading. However, to remove such food from the carton, it is advantageous to completely remove a side of the package, and the butt joint in the corner of the carton then becomes an asset.

Another feature of the package produced according to the method described above is that, upon melting of the surfaces to be joined, polymers are released which, due to their high density with respect to ambient air, tend to collect in the free space above a product disposed in the package. This may be insignificant in certain cases but disadvantageous if the package contains certain foodstuffs of milk or flour contents since the free polymers may have a negative effect on taste and smell. In fact, certain countries have regulations stipulating the amount of free polymers permissible in a food product.

The above-mentioned possible weaknesses or disadvantages of the cartons manufactured by the process illustrated in FIGS. 1–8 and described above are avoided in the package and method illustrated in FIGS. 9–17. In this second embodiment, a package is produced which withstands impacts and internal pressures, and is useful for all foodstuffs without any deleterious effect on their taste or smell. This is accomplished by initially forming an open-ended tubular body, or shell, by wrapping a sheet of the foamed thermoplastic material about a preformed mandrel in such a way that the meeting edges will slightly overlap, then introducing a heating means obliquely between the overlapped, slightly spaced edges for simultaneous melting of the outer corner of one edge and the inner corner of the other edge to produce parallel joining surfaces so that an overlap weld is obtained after the surfaces have been brought together. If the body is formed with corners, the weld is spaced from these corners. To avoid collection of free polymers in the package, use is made of a top and/or bottom cover panel portion which has a peripheral recess extending completely around said portion so as to form a plug projecting into the open end of the tubular body. The cover panel is welded to the shell with the use of pointed heating means which are employed to melt a V-shaped groove around the juncture of the shell and the cover panel, respectively, with pressure being applied to the cover panel to close the V-shaped groove and form a continuous weld.

Figures 9, 10:
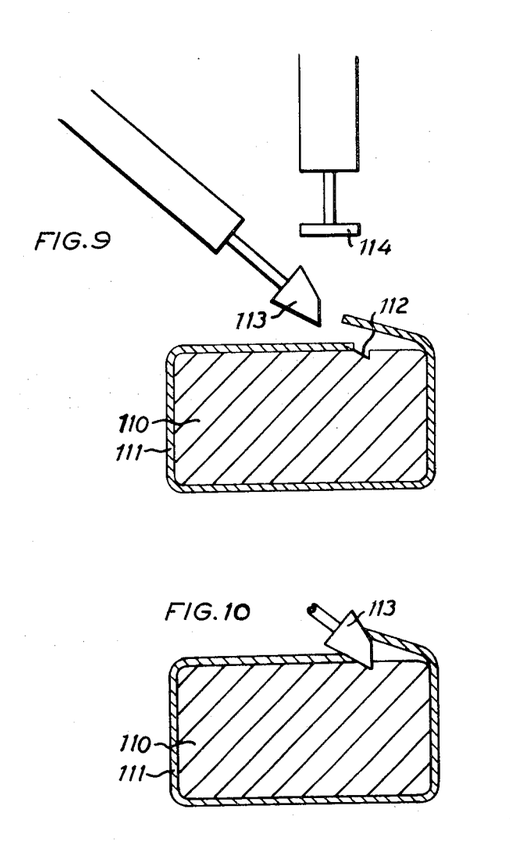
FIGS. 9–11 are schematic views illustrating successive steps in the manufacture of the body portion of a package according to an alternate embodiment of the invention.
Figure 11:
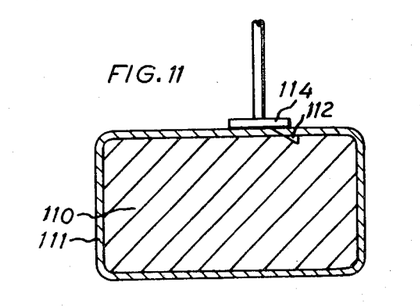

Referring specifically to FIGS. 9–11 a rectangular mandrel 110 with rounded corners is shown in cross section. A sheet of foam thermoplastic, preferably foam polystyrene, is wrapped around the mandrel 110 so as to form the body of a package of generally rectangular cross section. The abutting edges of the body blank 111 which extend transversely of the plane of the drawing slightly overlap, as will appear from FIG. 9, one edge being placed close to and the other edge above a recess 112 formed in the mandrel. After the sheet 111 has been so placed, a heating means in the form of a slightly wedge-shaped heating jaw 113 is introduced between the edges so that the outer corner of one edge and the inner corner of the other edge and the closely adjoining portions of the sheet edges are melted by direct contact with the heating jaw. The heating jaw is moved towards the mandrel 110 to such an extent that its point will penetrate into the recess 112. After a layer of melted plastic material of the requisite thickness has been formed, the heating jaw 113 is rapidly removed and the edges quickly brought together and subjected to pressure against the mandrel by means of a molding plate 114. The above principle can be applied in different ways, e.g., either by placing sheets one at a time on the mandrel, welding and then removing them from the mandrel, or by wrapping an elongate strip continuously about the core and causing it while being pulled along the core to pass a heating jaw and a subsequent pressure roller.

As will readily be seen, the joint of the tubular body is spaced from the corner thereof, which results in that, if a package having such a body is subjected to a heavy impact, the joint will be exposed primarily to tensile or hoop stress, with the result that the joint will withstand considerably heavier loads resulting from impact than if the joint had been situated at a corner of the shell where it would also be subjected to relatively high bending loads.

Figure 12:
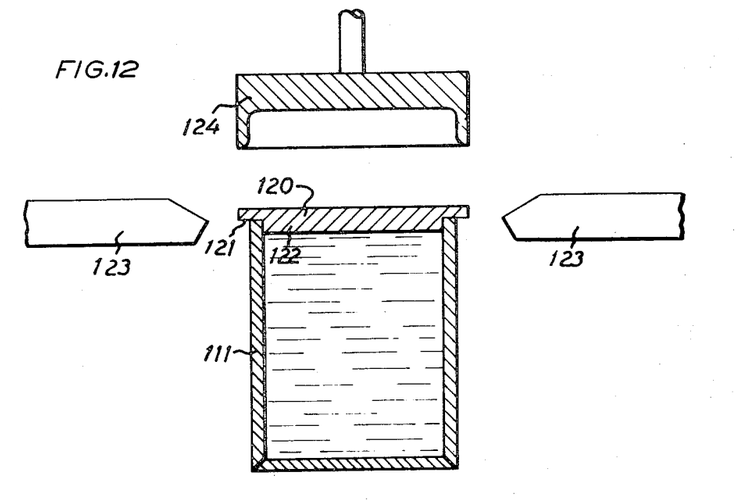
FIGS. 12–14 are vertical sectional views illustrating successive steps in an alternate process for welding a corner on the body portion.
Figure 13:
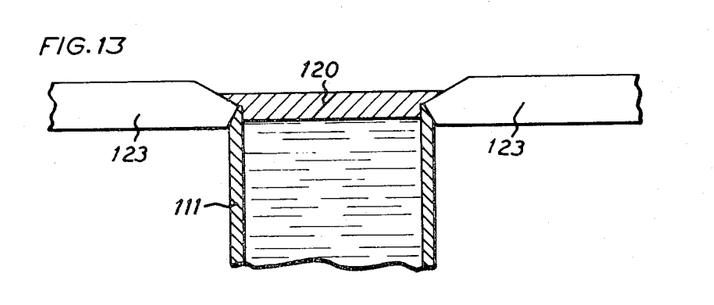
Figure 14:
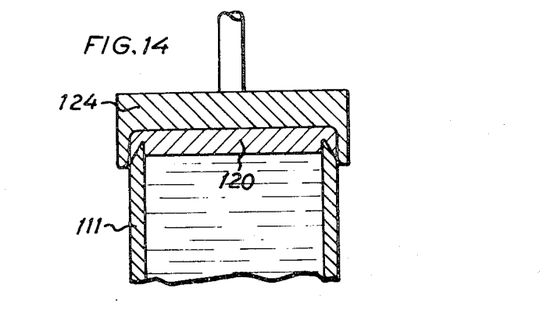

FIGS. 12–14 illustrate how a cover is placed on a container after filling thereof in order to prevent or minimize free polymers from collecting in the space between the cover and the product filled into the container. On this occasion use is made of a cover 120 of particular configuration with a recess 121 extending completely around the cover periphery so as to form a thickened plug portion 122 which, when the cover is placed on the tubular body of a packaging, projects into and closes the open end of the body. A cover of this type can be placed on a package conveyed on a conveyer belt directly after a product has been filled into the packaging, whereby any risk of spillage of the package contents during the continued movements on the conveyer belt is obviated.

The cover 120 is welded to the body 111 with the aid of a plurality of heating jaws 123 having wedge shaped or pointed ends which are pushed into the joint between the end surface of the shell facing the cover and the bottom of the recess 121. Movement of the jaws 123 are preferably substantialy parallel with the plane of the cover 120, as illustrated in FIG. 13. This will melt a portion of the body to form an obliquely upwardly and outwardly facing surface on a portion of the cover to form an obliquely downwardly and outwardly facing surface on the cover 20; however, due to the cover portion 122 projecting into the interior of the shell, the space within the package will not come into direct contact with the molten plastic. In conventional manner, a shaping tool 124 is then pushed down onto the upper end of the packaging after the heating jaws have been removed, as is shown in FIG. 14. The peripheral edge of the cover preferably projects slightly from the outer boundary surface of the body, as will be seen in FIG. 12, whereby the projected wedge shaped periphery of the cover is folded downwardly to close the V-shaped groove and bring the shaped surfaces together to be joined with the folded portion of the cover forming, in effect, a hinge joining the top panel and the body together with the welded joint being in the wall of the body as shown in FIG. 14. In FIGS. 12 and 13, only two heating jaws have been shown, but it is readily understood that if a container of rectangular cross section is concerned, a further pair of heating jaws will be arranged so as to be movable at right angles to the pair of heating jaws illustrated.

Figure 15:
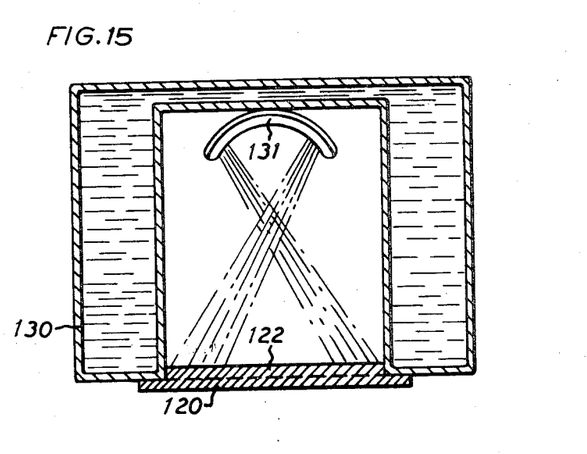
FIG. 15 is a sectional view illustrating one method of manufacturing a corner member of the type illustrated in FIGS. 12–14; and, FIGS. 16 and 17 illustrate the use of a recloseable dispensing opening in a cover member of the type shown in FIGS. 12–15.

The cover illustrated in FIG. 12 can be simply produced with the apparatus illustrated in FIG. 15, which comprises a water-cooled fixture 130 which in longitudinal section is in the form of an inverted U and has a cross sectional shape corresponding to that of the package to be manufactured. An infrared heater 131 is fastened to the inner side of the web portion of the U. By placing the fixture 130 on a panel of foam plastics and applying heat to the central portion, it is possible to realize an after-expansion of the plastics material exposed to the infrared heat, yielding a cover of the type shown in FIG. 12, with an upwardly projecting central plug portion 122. Alternatively, the cover may be produced by commencing with a sheet of fully expanded foam material and applying heat and pressure to the peripheral edge portion to initialy soften and compress the material to form the peripheral recess 121, then cooling the material to retain it in this condition.

Figure 16:
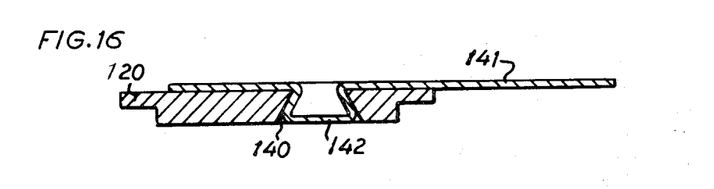
Figure 17:
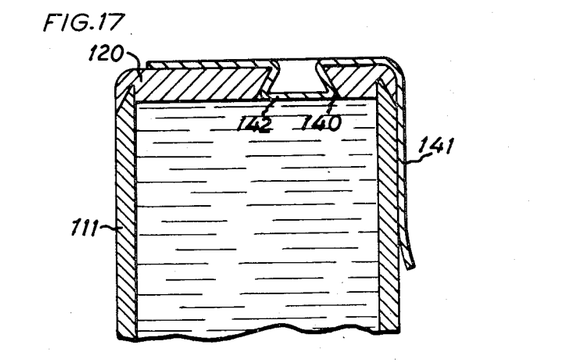

A cover of the type shown in FIGS. 12–14 can be utilized in several ways, e.g., it may be formed with a delivery opening 140 which can be closed by means of a readily detachable strip 141 as shown in FIGS. 16 and 17. The strip, which is preferably of impact-resistant plastic, is preshaped with closure means 142 which, before application of the cover 120 on the container, is placed in the opening 140 in the cover so as to sealingly penetrate thereinto. Preferably, the opening 140 in the cover is of upwardly and inwardly tapering shape, as shown in the drawing, and the closure portion of the strip has a complementary shape. After the cover has been placed on the container and secured thereto by the welding process described, the free end of the strip at the shaping of the joint by means of a member 124 will be pressed down against the side wall of the packaging, as is shown in FIG. 17, in which position the end of the strip can be easily grapsed and pulled upwards to uncover the opening in the cover. The closure portion of the strip is not destroyed by this tearing open and it can, therefore, be used again for reclosing the opening because of the configuration illustrated.

Of course, the packaging manufactured need not have the shape of a right-angled parallelepiped, but may also be cylindrical, spherical etc. It may also very well have the shape of a bottle. By this process is is possible in a relatively simple apparatus to produce rigid or semi-rigid packages at a considerably lower price than in the complicated machines hitherto used. The plastic material need not necessarily be foam polystrene but may also be any other foam plastic material having approximately the same rigidity. It should also be stresssed that it is possible to treat, instead of the one-ply polystyrene blanks described in the foregoing, laminated blanks of foam plastics material by the process according to the invention. Thus packages comprising an outer layer of foam polystyrene and an associated somewhat softer inner layer of foam polyethylene, have proved extremely advantageous whenever a higher inner or outer pressure may be expected, for instance because of the nature of the material enclosed in the package or because of the package being exposed to careless handling.

While I have disclosed and described preferred embodiments of my invention, I wish it understood that I do not intend to be restricted thereto, but that I do intend to include all embodiments thereof which would be apparent to one skilled in the art and which come within the spirit and scope of my invention.

I claim:

1. A process for manufacturing fluid tight packages from rigid foamed thermoplastic material comprising the steps of forming an open-ended tubular body member from said foamed thermoplastic material and subsequently closing at least one open end of said tubular body with a closure panel member formed from said foamed thermoplastic material by positioning said closure panel in juxtaposed relation to said at least one open end, simultaneously melting the edge portion of said closure panel around its entire periphery and the juxtaposed end portion of said tubular body around its entire periphery to form cooperating beveled sufaces having a layer of molten plastic material thereon extending around said closure panel and said body, respectively, and pressing said beveled surfaces into contact with one another around their entire periphery substantially simultaneously and while said plastic material thereon is still in the molten state to thereby form a continuous, strong, hermetically sealed joint between said closure panel and said tubular body.

2. The process defined in claim 1 wherein the step of closing at least one open end of said tubular body includes the step of initially closing one end of said tubular body, and subsequently closing the other open end by following the same procedural steps.

3. The process as defined in claim 1 wherein adjacent portions of said beveled surfaces are substantially parallel to one another and inclined with respect to the longitudinal axis of said body portion.

4. The process as defined in claim 1 wherein said foamed thermoplastic is foamed polystyrene.

5. The process as defined in claim 1 further comprising the step of pressing a shaping member into contact with said joint to shape the joint and to wipe any excess of molten plastic from the joint.

6. The process as defined in claim 5 wherein said step of melting said edge portion of said closure and said adjacent portion of said tubular body comprises contacting said portions within a beveled member having forming surfaces thereon disposed at an angle corresponding to the angle desired for said beveled surfaces.

7. The process as defined in claim 6 wherein said forming surfaces are corrugated whereby said beveled surfaces are formed with complementary undulated surfaces to thereby increase the area of contact therebetween.

8. The process as defined in claim 1 wherein said beveled surfaces are initially formed with adjacent portions thereof disposed in planes inclined with respect to one another, and wherein said step of pressing said beveled surfaces into contact with one another includes the step of bending the portion of one of said members adjacent one of said beveled surfaces to position said beveled surfaces in parallel contacting relation.

9. The process as defined in claim 8 wherein said closure panel member includes a central portion dimensioned to telescope into said at least one end in contact with the inner surface of said tubular body, said central portion lending radial support to said at least one open end during said step of positioning said beveled surfaces in parallel contacting relation.

10. The process defined in claim 1 wherein the step of forming said tubular body comprises wrapping a sheet of said foamed thermoplastic material about a preformed core and positioning the adjacent edges thereof in slightly overlapping spaced relation, simultaneously melting a portion of said adjacent edges along their entire length while maintaining said edges in said spaced relation to form substantially parallel beveled edges having a layer of molten plastic material thereon, and pressing said substantialy parallel beveled edges together while the plastic material thereon is still in the molten state to thereby form a continuous, strong, hermetically sealed joint extending the full length of said body.

11. The process as defined in claim 10 wherein said tubular body is generally rectangular in cross section, and wherein said sealed joint extending the full length of said body is positioned in a panel of said body in spaced relation to the corner portions thereof.

12. A process for manufacturing packages from rigid foamed thermoplastic material comprising the steps of forming an open-ended tubular body from said foamed thermoplastic material, forming a separate closure panel from said foamed thermoplastic material, said separate closure panel having a thickened central portion adapted to telescope into an open end of said body and engage the inner surface thereof and a peripheral flange extending outward from said thickened portion, positioning said closure panel onto one open end of said body with said thickened portion telescoping therein, contacting said peripheral flange and said one open end of said body portion with heating means substantially simultaneously around their entire peripheries to melt a portion of said foamed theromplastic material to form cooperating beveled surfaces extending therearound and having a layer of melted thermoplastic material thereon, removing said heating means, and immediately pressing said beveled surfaces together around their entire periphery substantially simultaneously and while said layers of thermoplastic material remain melted to thereby form a continuous, strong, hermetically sealed joint between said body portion and said closure panel.

13. The process as defined in claim 12 wherein said step of pressing said beveled surfaces together includes the step of pressing a shaping member against said joint throughout the length thereof to shape said joint and to wipe any excess molten material forced therefrom.

14. The process as defined in claim 12 wherein said closure panel is initially positioned onto said one open end with said peripheral flange in engagement with said open end, and wherein said step of melting a portion of said closure panel and said body portion comprises melting a substantially V-shaped groove around the periphery of said body and said panel with the surface defining one leg of the V being formed in said body portion wall and the surface defining the other leg of said V being formed in said peripheral flange.

15. The process as defined in claim 14 wherein the depth of said V-shaped groove is substantially equal to the wall thickness of said body portion, said step of pressing said beveled surfaces together includes the step of bending the peripheral edge portion of said closure panel downwardly along said body portion.

16. The process as defined in claim 15 wherein said step of pressing said beveled surfaces together includes the step of pressing a shaping member into contact with said joint to shape the joint and to wipe any excess molten plastic material from the joint.

17. The process as defined in claim 12 wherein the step of forming said body portion comprises wrapping a sheet of said foamed thermoplastic material about a preformed core and positioning the adjacent edges thereof in slightly overlapping spaced relation, simultaneously melting a portion of said adjacent edges along their entire length while maintaining said edges in said spaced relation to form substantially parallel beveled edges having a layer of molten plastic material thereon, and pressing said substantially parallel beveled edges together while the plastic material thereon is still in the molten state to thereby form a continuous, strong, hermetically sealed joint extending the full length of said body.

18. The process as defined in claim 17 wherein said body portion is generally rectangular in cross section, and wherein said sealed joint extending the full length of said body is positioned in a panel of said body in spaced relation to the corner portions thereof.

19. The process as defined in claim 12 further comprising the steps of forming said closure panel from a blank of foam plastic sheet by clamping and cooling the peripheral edge portion of said blank and applying heat to the central portion thereof to thereby further expand said central portion.

20. The process as defined in claim 19 further comprising the steps of forming a dispensing and filling opening in said closure panel, and applying a removable and reclosable closure member to said opening.

21. The process as defined in claim 21 further comprising the steps of forming said closure panel from a blank of fully expanded foam plastic sheet by heating and compressing the peripheral edge portion only of said blank, and subsequently cooling said peripheral edge portion to set it in the compressed condition.

References Cited

UNITED STATES PATENTS

| | | | |
|---|---|---|---|
| 3,411,969 | 11/1968 | Ragen et al. | 156—227 |
| 3,317,114 | 5/1967 | Ragen et al. | 156—211 X |
| 3,282,766 | 11/1966 | Wright | 156—304 |
| 3,356,552 | 12/1967 | Pearl | 156—69 |
| 3,712,844 | 1/1973 | Ratten et al. | 156—77 X |
| 3,391,619 | 7/1968 | Beregi | 156—218 X |
| 3,443,007 | 5/1969 | Hardy | 156—78 X |
| 3,615,965 | 10/1971 | Smith et al. | 156—69 |
| 3,400,040 | 9/1968 | Osgood | 156—216 X |
| 2,770,406 | 11/1956 | Lane | 156—78 X |
| 3,052,926 | 9/1962 | Quinche et al. | 156—196 X |
| 3,391,045 | 7/1968 | Mojonnier et al. | 156—304 |
| 3,625,785 | 12/1971 | Loberod | 156—69 |
| 3,354,603 | 11/1967 | Katzen et al. | 53—39 |

FOREIGN PATENTS

| | | | |
|---|---|---|---|
| 1,597,462 | 6/1970 | France | 156—227 |

RALPH S. KENDALL, Primary Examiner

B. J. LEWRIS, Assistant Examiner

U.S. Cl. X.R.

156—69, 215, 218, 282, 304, 306; 53—13, 39, 42